(12) United States Patent
Ikeda et al.

(10) Patent No.: US 8,383,295 B2
(45) Date of Patent: Feb. 26, 2013

(54) COMPOSITION FOR HOLOGRAPHIC RECORDING MEDIUM

(75) Inventors: Junichi Ikeda, Nara (JP); Nobuya Morishita, Nara (JP); Ryo Arai, Nara (JP); Chisato Katahira, Nara (JP); Yoshihiro Takatani, Chikusei (JP); Kouzaburo Yokouchi, Chikusei (JP); Mitsuteru Inoue, Toyohashi (JP); Pang Boey Lim, Toyohashi (JP)

(73) Assignees: Kyoeisha Chemical Co., Ltd., Osaka-Shi (JP); National University Corporation Toyohashi University of Technology, Toyohashi-Shi (JP)

( * ) Notice: Subject to any disclaimer, the term of this patent is extended or adjusted under 35 U.S.C. 154(b) by 367 days.

(21) Appl. No.: 12/452,845

(22) PCT Filed: Jul. 23, 2008

(86) PCT No.: PCT/JP2008/063160
§ 371 (c)(1),
(2), (4) Date: Jan. 25, 2010

(87) PCT Pub. No.: WO2009/014133
PCT Pub. Date: Jan. 29, 2009

(65) Prior Publication Data
US 2010/0128589 A1 May 27, 2010

(30) Foreign Application Priority Data
Jul. 24, 2007 (JP) .................................. 2007-191869

(51) Int. Cl.
*G03H 1/02* (2006.01)
(52) U.S. Cl. .............. 430/2; 430/1; 430/290; 430/281.1; 359/3
(58) Field of Classification Search .................. None
See application file for complete search history.

(56) References Cited

U.S. PATENT DOCUMENTS

| | | | |
|---|---|---|---|
| 3,472,796 A * | 10/1969 | McGary, Jr. et al. | ........... 528/73 |
| 4,818,776 A * | 4/1989 | Koleske | ......................... 522/31 |
| 5,665,494 A | 9/1997 | Kawabata et al. | |
| 5,858,614 A * | 1/1999 | Sato et al. | .................. 430/280.1 |

(Continued)

FOREIGN PATENT DOCUMENTS

| | | | |
|---|---|---|---|
| GB | 1172082 | * | 11/1969 |
| JP | 2000-310932 | * | 11/2000 |

(Continued)

OTHER PUBLICATIONS

Sep. 12, 2011 European Search Report issued in European Application No. 08778325.4.

(Continued)

*Primary Examiner* — Martin Angebranndt
(74) *Attorney, Agent, or Firm* — Oliff & Berridge, PLC

(57) ABSTRACT

A composition for holographic recording medium, which can be coated in a uniform thickness and enables to simply produce a high definition holographic recording medium is provided. And a holographic medium having a low error rate, high storage capacity, high-performance, high-density, which is produced using the composition for the holographic recording medium, is also provided. The composition comprises a (meth)acrylic acid ester group-containing polymerizable substance, an alicyclic epoxy group-containing cationical polymerizable substance of which is ring-opening polymerized by heat, and a hydroxyl group-containing substance which is reactive with the alicyclic epoxy group-containing cationical polymerizable substance. The holographic recording medium is produced by forming a holographic recording layer on a substrate by applying the composition on the base material and polymerizing the alicyclic epoxy group-containing cationical polymerizable substance and the hydroxyl group-containing substance.

12 Claims, 2 Drawing Sheets

U.S. PATENT DOCUMENTS

| | | | |
|---|---|---|---|
| 6,045,953 A * | 4/2000 | Ohe et al. | 430/1 |
| 2002/0142227 A1 * | 10/2002 | Dhar et al. | 430/1 |
| 2003/0087104 A1 * | 5/2003 | Dhar et al. | 428/422.8 |
| 2005/0068593 A1 * | 3/2005 | Hayase et al. | 359/1 |
| 2005/0089795 A1 * | 4/2005 | Cole et al. | 430/270.1 |
| 2005/0288528 A1 * | 12/2005 | Okazoe et al. | 562/849 |
| 2006/0115740 A1 | 6/2006 | Hayase et al. | |
| 2007/0042275 A1 | 2/2007 | Kamo | |
| 2007/0166625 A1 * | 7/2007 | Cole et al. | 430/1 |
| 2009/0081561 A1 * | 3/2009 | Kamo | 430/2 |
| 2009/0087753 A1 * | 4/2009 | Satou et al. | 430/2 |

FOREIGN PATENT DOCUMENTS

| | | |
|---|---|---|
| JP | A-2004-138686 | 5/2004 |
| JP | A-2006-154083 | 6/2006 |
| JP | A-2007-57572 | 3/2007 |
| JP | A-2008-139768 | 6/2008 |
| JP | A-2008-152170 | 7/2008 |
| WO | WO 2005/078532 A1 | 8/2005 |

OTHER PUBLICATIONS

Shoji et al.; "Cation Jugogata Photopolymer ni Okeru Triol no Hologram Tokusei eno Eikyo;" *Polymer Preprints*; 2005; p. 1PC095; vol. 54; No. 2; Japan.

International Search Report for International Application No. PCT/JP2008/063160, issued Nov. 4, 2008.

* cited by examiner

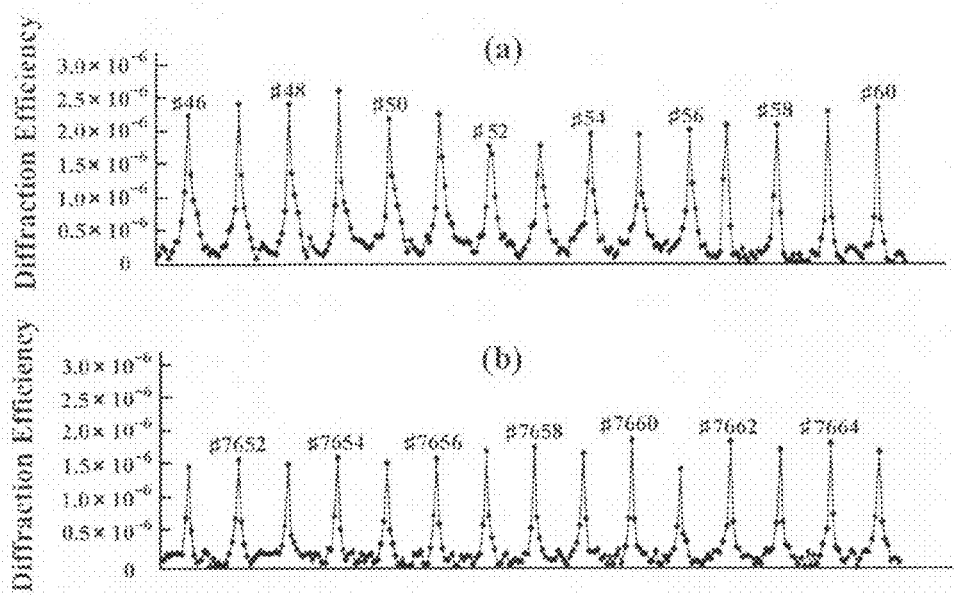
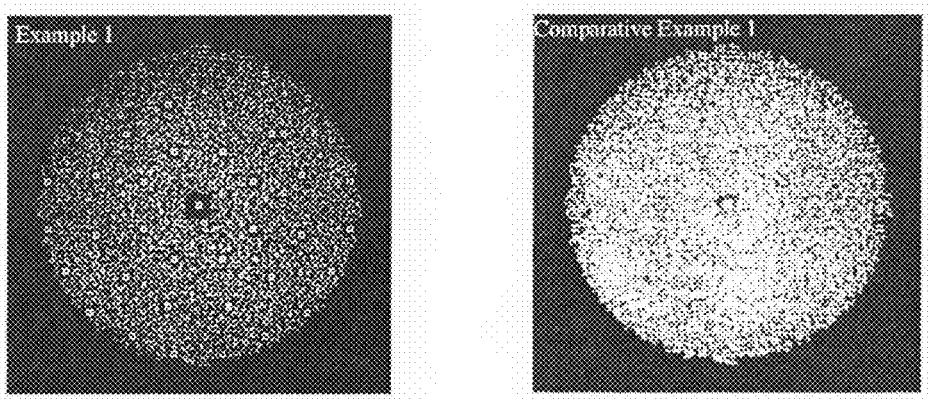

Fig. 3
(a)
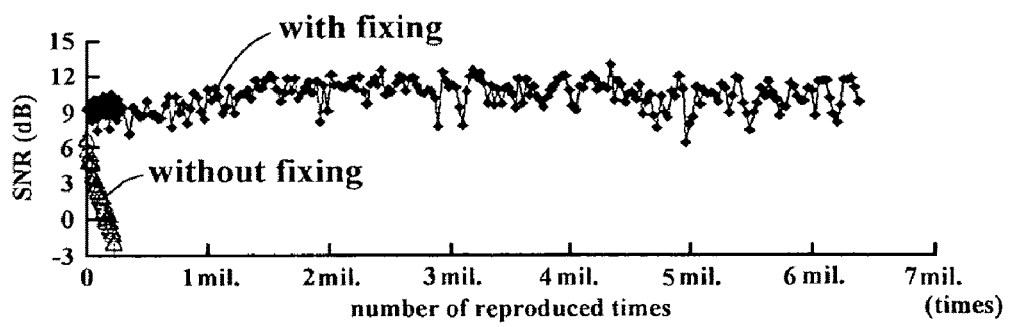
(b)
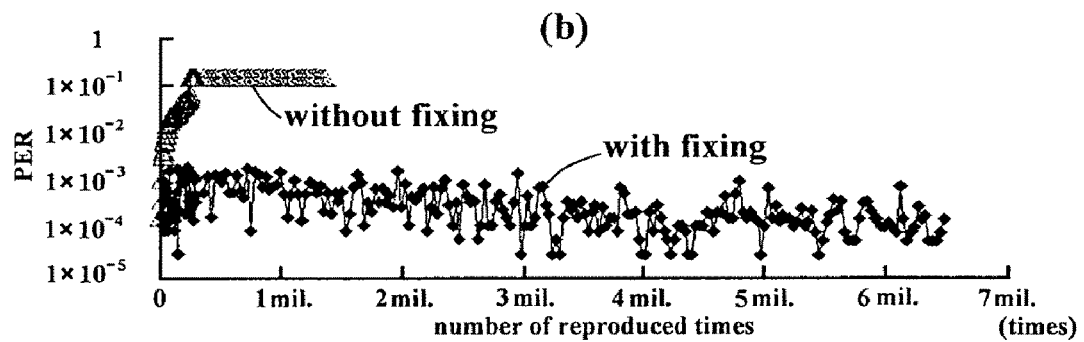

COMPOSITION FOR HOLOGRAPHIC RECORDING MEDIUM

TECHNICAL FIELD

The present invention relates to a composition for producing a holographic recording medium which records interference fringes of light, amplitude of light, or amplitude and a phase thereof, and also relates to a holographic recording medium formed from such composition.

BACKGROUND OF THE INVENTION

Holography can be used to record (or store) a large amount of data and can also be used to record and reproduce, through exposure, interference fringes produced by superposition of a transmission wave or reflected wave from an object and a reference wave, or can be used to record and reproduce distribution of amplitude and a phase of turbulence of waves on a surface.

As a recording medium used for the holography, a mass producible dry type volume holographic recording medium has been used. As a raw material for use in this volume holographic recording medium, photopolymers, azobenzene-based or diarylethene-based photochromic materials, photorefractive materials such as $LiNbO_3$ or liquid crystals have been known.

Among them, a volume holographic recording medium made of a photopolymer is excellent in industrial mass productivity and is a write-once read-only memory (WORM) which can be used for hologram optical disks or cards. For example, international publication No. WO2005/078532 discloses a volume hologram recording material comprising a polymer matrix having three-dimensional cross-linked structure, a polymerizable monomer and a tertiary amine compound as constituent components, wherein the polymer matrix is formed in the presence of the polymerizable monomer by a polymerization reaction different from the polymerization reaction of the polymerizable monomer.

To further increase the storage capacity of a volume holographic recording medium over those currently in use and to obtain a preformatable disk-like recording medium having low error rate, high sensitivity, high quality and high performance, a composition for a holographic recording medium, which can be made into a film having a uniform thickness and has photopolymer with an extremely low volume shrinking percentage when exposed to light, has been desired.

SUMMARY OF THE INVENTION

The present invention has been developed to solve the aforementioned problems. An object of the present invention is to provide a composition for a holographic recording medium capable of providing a recording layer having a uniform thickness and capable of easily producing a high-definition holographic recording medium. Another object of the present invention is to provide a holographic recording medium having low noise level, high sensitivity, low error rate, high performance, excellent multiple performance, high storage capacity and high density that can be produced from the composition.

A composition for a holographic recording medium which are made to attain the aforementioned purposes comprises; a (meth)acrylic acid ester group-containing polymerizable substance, an alicyclic epoxy group-containing cationical polymerizable substance of which ring openly polymerizes by heat, and a hydroxyl group-containing substance which reacts with the alicyclic epoxy group-containing cationical polymerizable substance.

The composition for holographic recording medium contains 0.5 to 30 parts by weight of the (meth)acrylic acid ester group-containing polymerizable substance, 20 to 80 parts by weight of the alicyclic epoxy group-containing cationic polymerizable substance and 5 to 70 parts by weight of the hydroxyl group-containing substance.

A holographic recording medium comprises a holographic recording layer which is formed by polymerization of the alicyclic epoxy group-containing cationical polymerizable substance with the hydroxyl group-containing substance in the composition for the holographic recording medium.

In the holographic recording medium, the holographic recording layer is formed on a substrate by the polymerization of the composition applied on the substrate.

In the holographic recording medium, the holographic recording layer having a sheet-like shape is formed by the polymerization of the composition.

A holographic recording method comprises;
irradiating light to the holographic recording medium according to Claim 3 to polymerize the (meth)acrylic acid ester group-containing polymerizable substance.

In the holographic recording method, the light is a laser beam.

The composition of holographic recording medium of the present invention can be simply prepared and formed into a uniformly thickened recording layer on a substrate. The holographic recording medium obtained by heat curing of the composition can be exposed, with sufficient sensitivity, to a coherent laser beam etc. and in addition volume shrinkage by the exposure can be fairly suppressed. Therefore, this holographic recording medium has high sensitivity and low error rate, and can record large volume of data with high density. Further, the structure thereof can be made simple, so that productivity can be improved.

According to the recording method in which this holographic recording medium is used, a large volume of data can be recorded and reproduced with almost no error.

BRIEF EXPLANATION OF THE DRAWINGS

FIG. 1 shows charts of results of record and reproduction of a hologram by plain wave using a holographic recording medium made from the composition for holographic recording medium of the present invention.

FIG. 2 shows photographs of recorded and reproduced page data images of the holographic recording medium of the present invention and a recording medium outside the present invention.

FIG. 3 shows charts showing changes in a signal-to-noise ratio and an error rate at the time of the page-data record/reproduction of the hologram of the holographic recording medium of the present invention.

DETAILED EXPLANATION OF THE INVENTION

Examples of the present invention are described below. However the scope of the present invention is not intended to be limited to these examples.

A preferable example of the composition for holographic recording medium can be prepared by mixing a (meth)acrylic acid ester group-containing polymerizable substance, an alicyclic epoxy group-containing cationical polymerizable substance, and a hydroxyl group-containing substance reactive with the alicyclic epoxy group-containing cationically polymerizable substance. If necessary, solvent and polymerization catalyst can be further added.

0.5-30, preferably 5-20, more preferably 10-20 parts by weight of the (meth)acrylic acid ester group-containing polymerizable substance is used.

20-80, preferably 45-70 parts by weight of the alicyclic epoxy group-containing cationical polymerizable substance is used.

5-70, preferably 10-50 parts by weight of the hydroxyl group-containing substance is used. In a case where a larger amount of the hydroxyl group-containing substance is used, the resulting holographic recording medium undergoes a big volume change when the holographic recording medium is used for holographical recording, and also the resulting holographic recording medium becomes susceptible to a temperature change because the linear expansion coefficient thereof increases. Therefore, the smaller the amount of the hydroxyl group-containing substance, the better.

As the (meth)acrylic acid ester group-containing polymerizable substance, for example, a compound containing an ester group formed from a (meth)acrylic acid and a diol. In particular, it is exemplified with a compound represented by the following chemical formula (1)

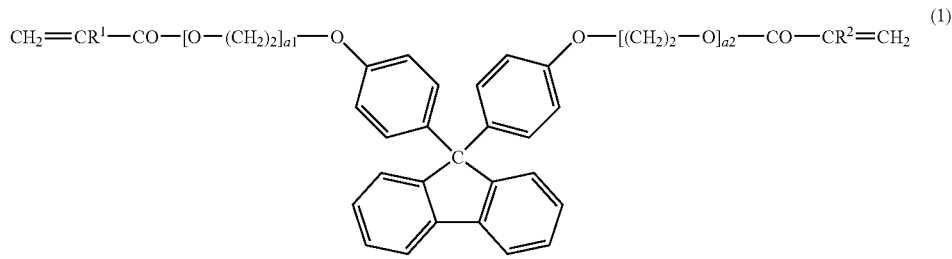

(1)

$CH_2=CR^1-CO-[O-(CH_2)_2]_{a1}-O$ ... $O-[(CH_2)_2-O]_{a2}-CO-CR^2=CH_2$ (in the chemical formula (1), a1 and a2 are the same or different from each other and are 0 to 6, and a1+a2 is a number of 2 to 6, and $R^1$ and $R^2$ are the same or different from each other and are hydrogen atom or methyl group). More preferably, a1+a2 is 2. This compound can be used alone or together with a commonly used compound such as a monofunctional (meth)acrylate, a monofunctional vinyl compound and a polyfunctional (meth)acrylate. As the monofunctional (meth)acrylate, phenoxy(meth)acrylate, phenylphenoxy(meth)acrylate, phenoxyethyl (meth)acrylate, phenylphenoxyethyl (meth)acrylate etc. can be exemplified. As the monofunctional vinyl compound, N-vinylacetamide, N-vinylformamide, a hydroxyl group-containing (meth)acrylate such as hydroxybutyl(meth)acrylate etc. can be exemplified. In addition, as the polyfunctional (meth)acrylate, a (meth)acrylic acid adduct of trimethylolpropane or its alkylene oxide adduct, a di(meth)acrylate of alkylene glycol such as neopentyl glycol, etc. can be exemplified.

The (meth)acrylic acid ester group-containing polymerizable substance has preferably a refractive index of 1.55 or more.

As the alicyclic epoxy group-containing cationical polymerizable substance, a compound containing, for example, an epoxy group-containing cycloalkyl group such as a polyfunctional epoxy compound having multiple epoxy groups or monofunctional epoxy compound having one epoxy group, may be used.

As the alicyclic epoxy group-containing cationical polymerizable substance, a polyfunctional epoxy compound. In particular, it is exemplified with a compound represented by the following chemical formula (2).

(2)

As another alicyclic epoxy group-containing cationical polymerizable substance, for example, a compound represented by the following chemical formula (3)

(3)

(wherein, in the chemical formula (3), b is a number of 0 to 10) can be also exemplified. A mixture of the compound (3) in which b is 0 and the compound (3) in which b is 1 to 10, for example, a mixture of equal parts of them, may be used.

As yet another alicyclic epoxy group-containing cationical polymerizable substance, for example, compounds represented by the following chemical formulas (4) to (13), (4)

(5)

(6)
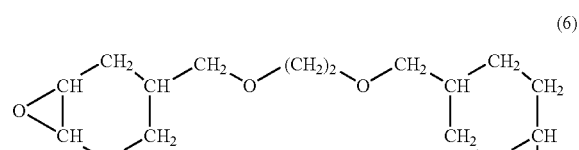

(7)
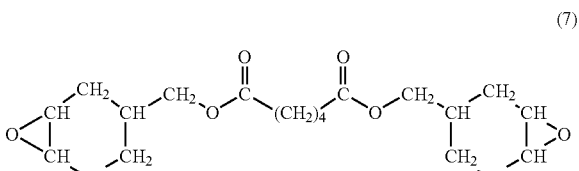

(8)
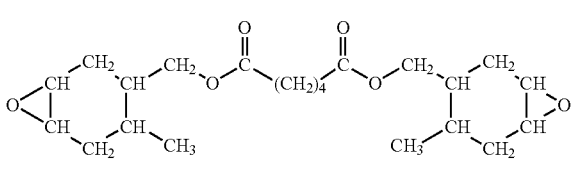

(9)
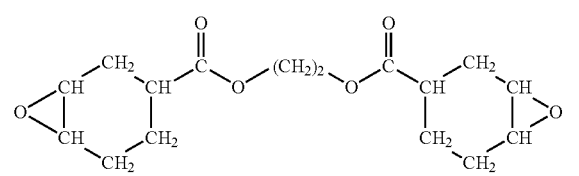

(10)
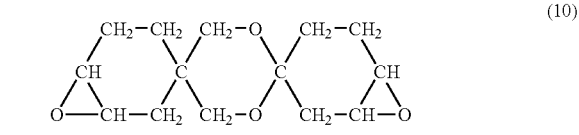

(11)
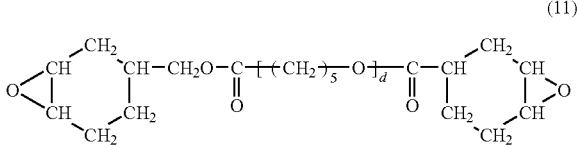

(in the chemical formula (11), d is a number of 1 or more)

(12)
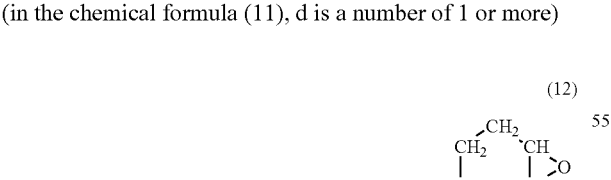

(in the chemical formula (12), e1 and e2 are a number of 0 or more each)

(13)
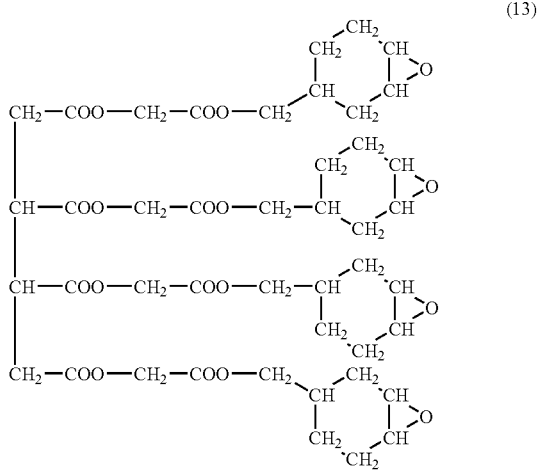

can be exemplified. In particular, UVR-6110, UVR-6199, Celloxide 2021, Celloxide 2083 and Celloxide 2085 (all are available from The Dow Chemical Company; Trade Name); Epolead GT-302, Epolead GT-303, Epolead GT-401 and Epolead GT-402 (all are available from Daicel Chemical Industries, Ltd., Trade Name) can be exemplified.

As the alicyclic epoxy group-containing cationical polymerizable substance, in particular, monofunctional epoxy compounds represented by the below chemical formulas (14) to (21)

(14)

(15)
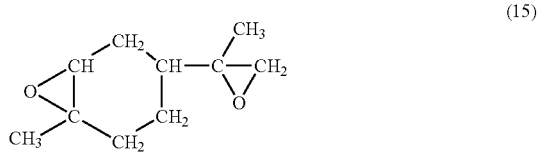

(16)
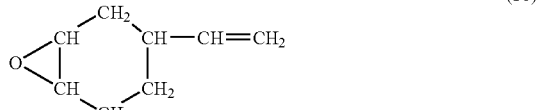

(17)
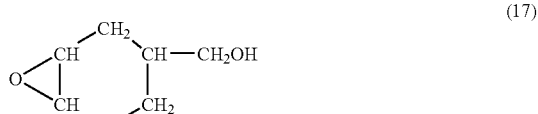

(18)
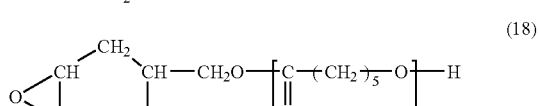

(in the chemical formula (18), g is a number of 1 or more)

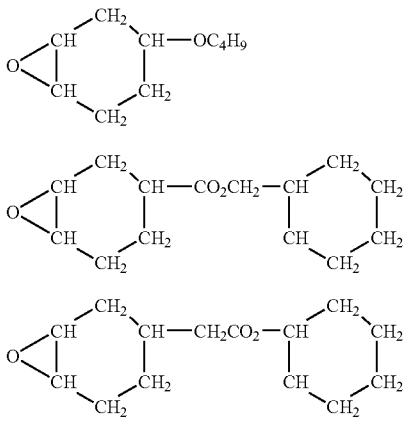

(19)

(20)

(21)

can be exemplified.

A value of a refractive index of the alicyclic epoxy group-containing cationical polymerizable substances is preferably 1.53 or less.

As the hydroxyl group-containing substance which reacts with the alicyclic epoxy group-containing cationical polymerizable substance, $$R^3\text{—}(OH)_h \qquad (22)$$

(in the chemical formula (22), h is a number of 1 to 6, $R^3$ is a linear, branched or cyclic saturated or unsaturated aliphatic group having 1 to 12 carbons. More specifically, $R^3$ is a group of $C_iH_{2i+1}$— in which i is a number of 1 to 12; a group of $C_jH_{2j}$— in which j is a number of 1 to 10; a group of $C_kH_{2k-1}$— in which k is a number of 2 to 6; or a residue derived by the removal of hydroxyl group, from an alcohol such as cyclohexanediol represented by the formula of $C_6H_{10}$—$(OH)_2$, trimethylolpropane, glycerin, alkylene glycol; or a residue derived by the removal of a hydroxyl group from an alkylated alcohol such as alkoxylated alkyl-alkylene glycol which are obtained from such an alcohol mentioned above through ethoxylation, propoxylation etc. of a part of the hydroxyl groups of the alcohol mentioned above: or polyalkyleneoxylated alcohol such as polyalkyleneoxylated alkylene glycol which is obtained through polyalkyleneoxylation, $$HO\text{—}(CH_2CH_2CH_2CH_2O)_l\text{—}H \qquad (23)$$

(in the chemical formula (23), l is a number of 0 to 50), $$CF_3(CF_2)_{m1}\text{—}(CH_2)_{m2}\text{—}[O\text{—}(CH_2)_{m3}]_{m4}\text{—}OH \qquad (24)$$

(in the chemical formula (24), m is a number of 0 to 11, m2 is a number of 1 to 2, m3 and m4 are a number of 0 to 4 each), perfluoro adamantyl-containing alcohol represented by the chemical formula (25)

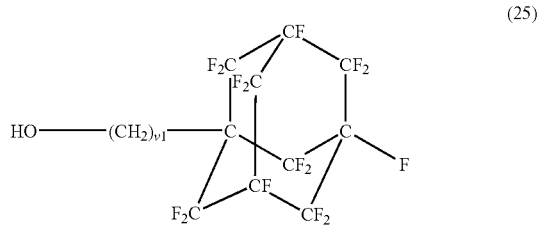

(25)

(wherein, in the chemical formula (25), v1 is the same or different from each other and is a number of 0 to 1), following chemical formula (26), $$R^4O\text{—}[(CH_2)_{n1}\text{—}O]_{n2}\text{—}Rf\text{—}[O\text{—}(CH_2)_{n3}]_{n4}\text{—}OR^5 \qquad (26)$$

(in the chemical formula (26), n1 to n4 are a number of 0 to 4 each; n2+n4 is a number of 0 to 10;
$R^4$, $R^5$ represents hydrogen or $C_pH_{2p+1}$, one of which is at least hydrogen atom, and p is a number of 1 to 12;
Rf is perfluoro adamantyl-containing group selected from the group consisting of $C_qF_{2q}$ (wherein q is a number of 1 to 8), —$(CH_2)_{s1}$—$(CF_2)_{s2}$—$(CH_2)_{s3}$— (wherein s1 and s3 are the same or different to each other and are a number of 1 to 2, s2 is a number of 6 to 10),
—$(CH_2)_{t1}$—$(CF_2)_{t2}$—C[—$(CF_2)_{t3}$—F][—$(CF_2)_{t4}$—F]—$(CH_2)_{t5}$— (wherein t1 and t5 are the same or different from each other and are a number of 1 to 2 each, t2 is a number of 1 to 9, t3 is a number of 0 to 8, t4 is a number of 1 to 9, t2+t3+t4 is a number of 6 to 10),
—$(CH_2)_{u1}$—$(CF_2)_{u2}$—(—O—$C_{u3}F_{2\times(u3)}$)$_{u4}$—O—$(CF_2)_{u5}$—$(CH_2)_{u6}$— (wherein u1 and u6 are the same or different to each other and are a number of 1 to 2, u2 is a number of 1 to 3, u3 is a number of 1 to 4, u4 is a number of 1 to 9, u5 is a number of 0 to 3 and u2+u3×u4+u5 is a number of 6 to 10), and
a fluorinated substituent-containing group represented by

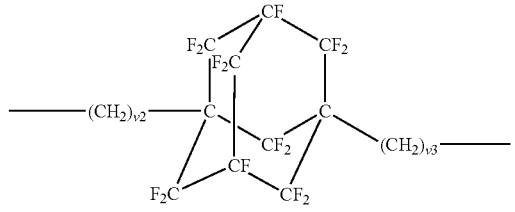

(wherein v2 and v3 are the same or different and are a number of 0 to 1 each)), can be exemplified. As the hydroxyl group-containing substance, these substances mentioned above can be used solely or in a mixture of two or more. Also note that a to v3 in the formulas are for example, an integer.

The hydroxyl group-containing substance preferably has a refractive index of 1.53 or less.

The holographic recording medium is formed by a process in which this composition is applied on a substrate or injected into a mold, and then the alicyclic epoxy group-containing cationical polymerizable substance is cationical polymerized and cured by heat. At this time, the hydroxyl group-containing substance simultaneously reacts with the cationical polymerizable substance to form a holographic recording layer having a micro reaction field.

At this time, as a heat curing agent, aromatic onium salts, for example, Saneido SI-60L, Saneido SI-80L, Saneido SI-110L (all are available from Sanshin Chemical Industry Co., Ltd.: Trade Name) may be added.

Further, a photo polymerization initiator to be used at recording, such initiator, which is suitable for an operation wavelength of light, is used. When recording is carried out using bluish light having an operation wavelength of about 405 nm, an alkylphenone-based photo polymerization initiator such as Irgacure 651, Irgacure 184, Irgacure 1173, Irgacure 907 (all are available from Ciba Specialty Chemicals Inc.: Trade Name; Irgacure is a registered Trade Mark) and acyl phosphine oxide-based photo polymerization initiator such as Darocur TPO, Irgacure 819 (all are available from Ciba Specialty Chemicals Inc.: Trade Name, Darocur and Irgacure are registered Trade Marks) can be used. In a case where recording is carried out using greenish light having an operation wavelength of about 532 nm or reddish light having an operation wavelength of about 630 nm, a titanocene-based photo polymerization initiator such as Irgacure 784 (available from Ciba Specialty Chemicals Inc.: Trade Name, Irgacure is a registered Trade Mark) can be used. These may be used solely or together with a sensitizing dye.

As the holographic recording medium, a transparent type disk-like medium having, for example, a holographic recording layer formed onto an upper surface of a glass substrate layer on the bottom surface of which an antireflection film is applied, another glass layer, a servo base plate layer and an antireflective film layer are laminated in this order from bottom to top, can be exemplified.

As another holographic recording medium, a reflective type disk-like medium having, for example, a polycarbonate substrate layer, aluminum layer, transparent resin film layer, wavelength selective film layer, glass layer, holographic recording layer, glass layer and antireflective film layer are laminated in this order from bottom to top, can also be exemplified. The holographic recording mediums may be shaped into a coupon-like shape (quadrilateral shape).

When a coherent light of the laser beam is irradiated to the holographic recording medium, the (meth)acrylic acid ester group-containing polymerizable substance is polymerized to cause a refractive-index modulation there so that a high-definition holographic recording can be carried out.

In the micro reaction field of the holographic recording medium, the (meth)acrylic acid ester group-containing polymerizable substance is irradiated with the laser beam to induced photo radical polymerization and then accordingly to form the holographic recording layer which records interference fringes.

At this time the holographic recording medium shrinks by only about 0.3%.

Hereunder, embodiments of the present invention in which preparation of a composition for the holographic recording medium of the present invention, trial production of a holographic recording medium using the composition, and evaluation of physical properties and functionality of the holographic recording medium were executed are explained.

EXAMPLE 1

As a (meth) acrylic acid ester group-containing polymerizable substance, 10 parts by weight of a polymerizable substance having a refractive index of 1.61 and being represented by a below chemical formula (27)

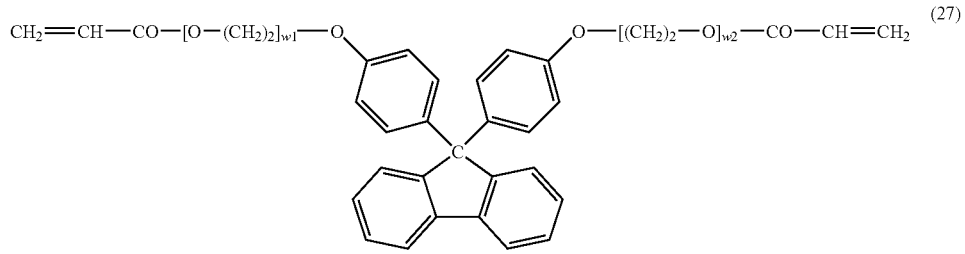

(in the chemical formula (27), w1 and w2 are determined under a condition of w1+w2 is a number of 2), as a alicyclic epoxy group-containing cationical polymerizable substance, 45 parts by weight of an alicyclic epoxy group-containing cationical polymerizable substance having a refractive index of 1.49 and being represented by a below chemical formula (2),

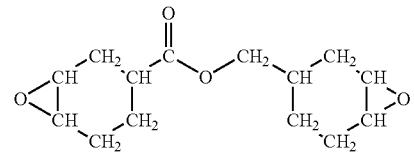

as a hydroxyl group-containing substance, 45 parts by weight of a hydroxyl group-containing substance having a refractive index of 1.44 and being represented by a below chemical formula (28)

(in the chemical formula (28), x is 13, as a heat curing agent, 5 parts by weight of Saneido SI-60L (available from Sanshin Chemical Industry Co., Ltd.: Trade Name), and as a photo polymerization initiator, 3 parts by weight of Irgacure 784 (available from Ciba Specialty Chemicals Inc.: Trade Name)

were homogeneously dissolved to obtain a composition for a holographic recording medium.

COMPARATIVE EXAMPLE 1

Comparative Example 1 was carried out in the same manner as that of Example 1 except that phenylphenoxy ethylacrylate was used as the polymerizable substance.

Transparent coupon-like holographic recording mediums were prepared by sandwiching the composition obtained in Example 1 or Comparative Example 1 between the surfaces having no antireflective film of two 1.2 mm-thickness glass base plate having antireflective film on one surface of the base plate with a gap of 400 µm or 800 µm, and then heating them in an oven at a controlled temperature of 120° C. for 1 hour to heat cure while maintaining the gaps. Thus transparent coupon-like shaped holographic recording mediums were obtained.

Further, reflective-type coupon-like shaped holographic recording mediums were prepared by: sandwiching the composition obtained in Example 1 between the surfaces having no antireflective film of a base plate having an aluminum reflective film formed at a format signal surface and a wavelength-selecting film formed as a transparent layer applied on the aluminum reflective film and a glass disk having an antireflective film with a gap of 400 µm, and then heating them in an oven at a controlled temperature of 120° C. for 1 hour to heat cure while maintaining the gap. Thus reflective-type coupon-like shaped holographic recording mediums were obtained.

Mold release agent, Chemlease AF-7 (available from Chemlease Japan Co., Ltd.; Trade Name) was applied on a surface of a cast die having a cavity for molding a 400 μm thick sheet to form a mold release agent layer. Into the cavity of the cast die, the composition obtained in Example 1 was injected. Then the composition in the cast die was heated at 120° C. for 1 hour to thermally cure. The resulting cured material was released from the cavity of the cast die, obtaining a 400 μm thick sheet-like recording material base plate. This sheet-like recording material base plate was cut into a coupon-like shape, and then it was adhered to a glass-exposed surface of a coupon glass base plate having a surface of an aluminum reflective film with an antireflective film and the glass-exposed surface having no antireflective film of the glass with antireflective film using adhesive EPO-TEK 310M (available from Epoxy Technology Inc.: Trade Name). Thus another reflective-type coupon-like shaped holographic recording mediums were obtained.

Incidentally a sheet-like recording material base plate can be produced from this composition by a heating drawing method.

Physical properties and performance of these holographic recording mediums were evaluated.

Multiple recording was carried out, using a plain wave tester, on the holographic recording medium which was formed from the composition for the holographic recording medium of the present invention in Example 1. Material film thickness was 800 μm, the total light exposure was 648,878 mJ/cm$^2$ and light exposure density was 7 mW/cm$^2$. The results are shown in FIG. 1. As is clear from FIG. 1, even after about 50 multiples as shown in FIG. 1 (*a*) and even after about 7,700 multiples as shown in FIG. 1 (*b*), their noise level was (2–5)×10$^{-7}$ which shows that the holographic recording medium has an extremely low noise and has high multiple performance.

A page data recorded/reproduced image of the holographic recording medium of Example 1, which is formed with the composition for the holographic recording medium of the present invention, is shown in FIG. 2. As is clear from FIG. 2, image quality of Example 1 is dramatically improved when compared with the recording medium of comparative Example 1.

Results of repetition stability assessment of record/reproduction of the holographic recording medium of Example 1, which was formed from the composition for the holographic recording medium of the present invention, are shown in FIG. 3. FIG. 3 (*a*) shows a signal-to-noise ratio (SNR) and FIG. 3 (*b*) shows an error rate (PER). As is clear from FIG. 3, after hologram recording and after fixing (i.e. light irradiation process) which is so-called fixing process, repetition stability is extremely stable even beyond 6 million times.

INDUSTRIAL APPLICABILITY

The composition for holographic recording medium of the present invention is useful for a raw material for hologram memory and optical components, and is also useful for a hologram material. The holographic recording medium having a recording layer obtained by heat curing of the composition is useful for large volume, high density optical recording medium. The recording method using this recording medium can be used as an auxiliary memory to record data of a personal computer and is used to record/reproduce programs or images having massive amount of data.

What is claimed is:
1. A composition for a holographic recording medium comprising:
a (meth)acrylic acid ester group-containing polymerizable substance represented by the following chemical formula (I)

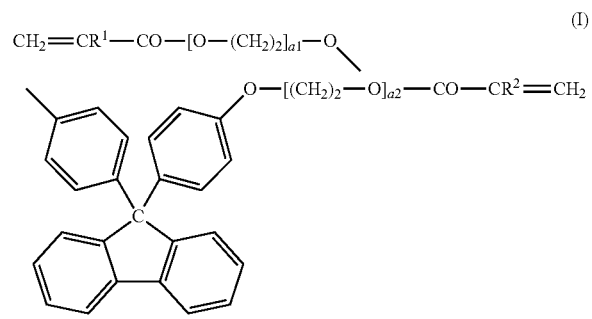

(I)
$$CH_2=CR^1-CO-[O-(CH_2)_2]_{a1}-O$$
$$O-[(CH_2)_2-O]_{a2}-CO-CR^2=CH_2$$

in the chemical formula (I), a1 and a2 are the same or different and are 0 to 6, and a1+a2 is a number of 2 to 6, and
R$^1$ and R$^2$ are the same or different and are hydrogen atom or methyl group,
an alicyclic epoxy group-containing cationically polymerizable substance of which ring openly polymerizes by heat, and
a hydroxyl group-containing substance which reacts with the alicyclic epoxy group-containing cationically polymerizable substance and which is represented by the following chemical formula

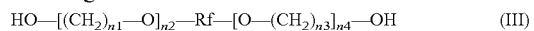

$$HO-[(CH_2)_{n1}-O]_{n2}-Rf-[O-(CH_2)_{n3}]_{n4}-OH \qquad (III)$$

in the chemical formula (III)
n1 to n4 are a number of 0 to 4 each,
n2+n4 is a number of 0 to 10, and
Rf is a fluorinated substituent-containing group represented by

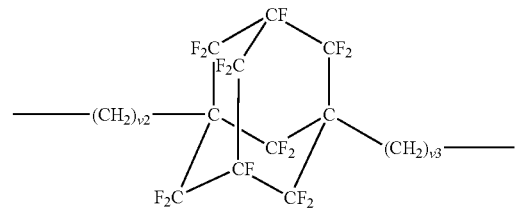

wherein v2 and v3 are the same or different and are a number of 0 to 1 each.
2. The composition for holographic recording medium according to claim 1, wherein the (meth)acrylic acid ester group-containing polymerizable substance is used in the range of 0.5 to 30 parts by weight, the alicyclic epoxy group-containing cationically polymerizable substance is used in the range of 20 to 80 parts by weight and the hydroxyl group-containing substance is used in the range of 5 to 70 parts by weight.
3. A holographic recording medium comprising:
a holographic recording layer which is formed by thermal polymerization of the alicyclic epoxy group-containing cationically polymerizable substance with the hydroxyl group-containing substance in the composition for the holographic recording medium according to claim 2.
4. The holographic recording medium according to claim 3, wherein the holographic recording layer is formed on a substrate by the polymerization of the composition applied on the substrate.

5. The holographic recording medium according to claim 3, wherein the holographic recording layer having a sheet-like shape is formed by the polymerization of the composition.

6. A holographic recording method comprising: irradiating light to the holographic recording medium according to claim 3 to polymerize the (meth)acrylic acid ester group-containing polymerizable substance and record a hologram.

7. The holographic recording method according to claim 6, wherein the light is a laser beam.

8. A holographic recording medium comprising:
a holographic recording layer which is formed by thermal polymerization of the alicyclic epoxy group-containing cationically polymerizable substance with the hydroxyl group-containing substance in the composition for the holographic recording medium according to claim 1.

9. The holographic recording medium according to claim 8, wherein the holographic recording layer is formed on a substrate by the polymerization of the composition applied on the substrate.

10. The holographic recording medium according to claim 8, wherein the holographic recording layer having a sheet-like shape is formed by the polymerization of the composition.

11. A holographic recording method comprising:
irradiating light to the holographic recording medium according to claim 8 to polymerize the (meth)acrylic acid ester group-containing polymerizable substance and record a hologram.

12. The holographic recording method according to claim 11, wherein the light is a laser beam.

* * * * *